(12) United States Patent
Chen et al.

(10) Patent No.: US 10,489,636 B2
(45) Date of Patent: Nov. 26, 2019

(54) LIP MOVEMENT CAPTURING METHOD AND DEVICE, AND STORAGE MEDIUM

(71) Applicant: Ping An Technology (Shenzhen) Co., Ltd., Shenzhen, Guangdong (CN)

(72) Inventors: Lin Chen, Guangdong (CN); Guohui Zhang, Guangdong (CN)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/337,934

(22) PCT Filed: Oct. 31, 2017

(86) PCT No.: PCT/CN2017/108747
§ 371 (c)(1),
(2) Date: Mar. 29, 2019

(87) PCT Pub. No.: WO2019/033568
PCT Pub. Date: Feb. 21, 2019

(65) Prior Publication Data
US 2019/0228209 A1    Jul. 25, 2019

(30) Foreign Application Priority Data
Aug. 17, 2017 (CN) .......................... 2017 1 0709114

(51) Int. Cl.
*G06K 9/00* (2006.01)
(52) U.S. Cl.
CPC ..... *G06K 9/00281* (2013.01); *G06K 9/00255* (2013.01); *G06K 9/00288* (2013.01); *G06K 9/00302* (2013.01)
(58) Field of Classification Search
CPC ........... G06K 9/00281; G06K 9/00288; G06K 9/00255; G06K 9/00302
(Continued)

(56) References Cited

U.S. PATENT DOCUMENTS 6,014,625 A * 1/2000 Lee .......................... G06T 17/00
704/201
6,272,466 B1 * 8/2001 Harada .............. G06K 9/00221
704/270
(Continued)

FOREIGN PATENT DOCUMENTS

CN    104616438 A    5/2015
CN    104838339 A    8/2015
(Continued)

OTHER PUBLICATIONS

International Search Report of PCT Patent Application No. PCT/CN2017/108747 dated Mar. 28, 2018.
(Continued)

*Primary Examiner* — Andrew M Moyer (57) ABSTRACT

The application discloses a lip movement capturing method and device and a storage medium. The method includes: acquiring a real-time image shot by a photographic device and extracting a real-time facial image from the real-time image; inputting the real-time facial image into a pretrained lip average model and recognizing t lip feature points representative of positions of lips in the real-time facial image; and calculating a movement direction and movement distance of the lips in the real-time facial image according to x and y coordinates of the t lip feature points in the real-time facial image. According to the application, movement information of the lips in the real-time facial image is calculated according to the coordinates of the lip feature points to implement real-time capturing of movements of the lips.

10 Claims, 4 Drawing Sheets

(58) Field of Classification Search
USPC .......................................................... 382/118
See application file for complete search history.

(56) References Cited

U.S. PATENT DOCUMENTS

2013/0226587 A1* 8/2013 Cheung .............. G06K 9/00335
704/273
2016/0148616 A1* 5/2016 Takayanagi ............. G10L 15/32
704/235

FOREIGN PATENT DOCUMENTS

| CN | 105354527 A | 2/2016 |
| CN | 106295566 A | 1/2017 |
| CN | 106919891 A | 7/2017 |

OTHER PUBLICATIONS

First Office Action of Counterpart Chinese Patent Application No. 201710709114.7 dated May 25, 2018.
Zhengnan Xie, Facial Landmark Detection via Multi-task Feature Selection and Self-adapted Model, Chinese Master's Theses Full-text Database—Information and Technology, Feb. 15, 2017, No. 2, pp. 2-5, 13-26, 32-38.
Jie Hou, A Study of Facial Expression Recognition, Chinese Master's Theses Full-text Database—Information and Technology, Oct. 15, 2014, No. 10, pp. 21-26.
Notification to Grant Patent Right of counterpart Chinese Patent Application No. 201710709114.7 dated Jun. 19, 2018.

* cited by examiner

LIP MOVEMENT CAPTURING METHOD AND DEVICE, AND STORAGE MEDIUM

CLAIM OF PRIORITY

This application is based on the Paris Convention and claims priority to China Patent Application No. CN201710709114.7, filed on Aug. 17, 2017 and entitled "Lip Movement Capturing Method and Device, and Storage Medium", which is hereby incorporated by reference in its entirety.

TECHNICAL FIELD

The application relates generally to the technical field of computer vision processing, and more particularly relates to a lip movement capturing method and device, and a computer-readable storage medium.

BACKGROUND

Lip movement capturing is a biological recognition technology for recognizing a lip movement of a user on the basis of facial feature information of the user. At present, lip movement capturing is applied to extensive fields, plays a very important role in many fields of access control and attendance, identity recognition and the like and brings great convenience to people's lives. A deep learning method is usually adopted for a lip movement capturing product. A lip feature classification model is trained by deep learning and then a lip feature is judged by use of the classification model.

However, when the deep learning method is adopted to train lip features, the number of the lip features completely depends on types of lip samples. For example, if mouth opening and mouth closing are to be judged, it is at least necessary to acquire a great number of samples in which mouths are opened and closed. If lip curling is to be judged, it is necessary to acquire a great number of samples in which lips are curled and then training is performed again. Therefore, not only is time consumed but also real-time capturing may not be implemented.

SUMMARY

The application provides a lip movement capturing method and device and a computer-readable storage medium, which mainly aim at calculating movement information of lips in a real-time facial image according to a coordinate of a lip feature point to implement real-time capturing of a lip movement.

In order to achieve the foregoing objective, the application provides an electronic device, which includes a memory, a processor and a photographic device, the memory including a lip movement capturing program and the lip movement capturing program being executed by a processor to implement the following steps of:

a real-time facial image acquisition step: acquiring a real-time image shot by the photographic device and extracting a real-time facial image from the real-time image by use of a face recognition algorithm;

a feature point recognition step: inputting the real-time facial image into a pretrained lip average model and recognizing t lip feature points representative of positions of lips in the real-time facial image by use of the lip average model; and a lip movement judgment step: calculating a movement direction and movement distance of the lips in the real-time facial image according to x and y coordinates of the t lip feature points in the real-time facial image.

Preferably, the lip movement judgment step includes:

calculating a distance between an inner-side central feature point of the upper lip and inner-side central feature point of the lower lip in the real-time facial image and judging an opening degree of the lips;

connecting a left-side outer mouth corner feature point with feature points, closest to the left-side outer mouth corner feature point, on outer contour lines of the upper and lower lips to form vectors $\vec{V}_1$ and $\vec{V}_2$ respectively, and calculating an included angle between the vectors $\vec{V}_1$ and $\vec{V}_2$ to obtain a leftward curling degree of the lips; and connecting a right-side outer mouth corner feature point with feature points, closest to the right-side outer mouth corner feature point, on the outer contour lines of the upper and lower lips to form vectors $\vec{V}_3$ and $\vec{V}_4$ respectively, and calculating an included angle between the vectors $\vec{V}_3$ and $\vec{V}_4$ to obtain a rightward curling degree of the lips.

Preferably, the feature point recognition step further includes:

aligning the real-time facial image and the lip average model and searching the real-time facial image for the t lip feature points matched with t lip feature points of the lip average model by use of a feature extraction algorithm.

Preferably, training steps for the lip average model include:

establishing a sample library with n facial images and marking t feature points at a lip part in each facial image in the sample library, the t feature points being uniformly distributed at the upper and lower lips and left and right mouth corners; and training a facial feature recognition model by use of the facial images marked with the lip feature points to obtain the lip average model about faces.

In addition, in order to achieve the foregoing objective, the application also provides a lip movement capturing method, which includes:

a real-time facial image acquisition step: acquiring a real-time image shot by a photographic device and extracting a real-time facial image from the real-time image by use of a face recognition algorithm;

a feature point recognition step: inputting the real-time facial image into a pretrained lip average model and recognizing t lip feature points representative of positions of lips in the real-time facial image by use of the lip average model; and a lip movement judgment step: calculating a movement direction and movement distance of the lips in the real-time facial image according to x and y coordinates of the t lip feature points in the real-time facial image.

Preferably, the lip movement judgment step includes:

calculating a distance between an inner-side central feature point of the upper lip and inner-side central feature point of the lower lip in the real-time facial image and judging an opening degree of the lips;

connecting a left-side outer mouth corner feature point with feature points, closest to the left-side outer mouth corner feature point, on outer contour lines of the upper and lower lips to form vectors $\vec{V}_1$ and $\vec{V}_2$ respectively, and calculating an included angle between the vectors $\vec{V}_1$ and $\vec{V}_2$ to obtain a leftward curling degree of the lips; and connecting a right-side outer mouth corner feature point with feature points, closest to the right-side outer mouth corner feature point, on the outer contour lines of the upper and lower lips to form vectors $\vec{V}_3$ and $\vec{V}_4$ respectively, and calculating an included angle between the vectors $\vec{V}_3$ and $\vec{V}_4$ to obtain a rightward curling degree of the lips.

Preferably, the feature point recognition step further includes:

aligning the real-time facial image and the lip average model and searching the real-time facial image for the t lip feature points matched with t lip feature points of the lip average model by use of a feature extraction algorithm.

Preferably, training steps for the lip average model include:

establishing a sample library with n facial images and marking t feature points at a lip part in each facial image in the sample library, the t feature points being uniformly distributed at the upper and lower lips and left and right mouth corners; and training a facial feature recognition model by use of the facial images marked with the lip feature points to obtain the lip average model about faces.

Moreover, in order to achieve the foregoing objective, the application also provides a computer-readable storage medium, which includes a lip movement capturing program, the lip movement capturing program being executed by a processor to implement any step in the foregoing lip movement capturing method.

According to the lip movement capturing method and device and computer-readable storage medium disclosed in the application, the lip feature points are recognized from the real-time facial image and movement information of the lips in the real-time facial image is calculated according to the coordinates of the lip feature points, so that movements of the lips may be captured in real time without extracting various movement samples of the lips for deep learning.

Achievement of the objective, functional characteristics and advantages of the application will further be described in combination with embodiments and with reference to the accompanying drawings.

DETAILED DESCRIPTION OF ILLUSTRATED EMBODIMENTS

It is to be understood that the specific embodiments described herein are adopted not to limit the application but only to explain the application.

Figure 1:
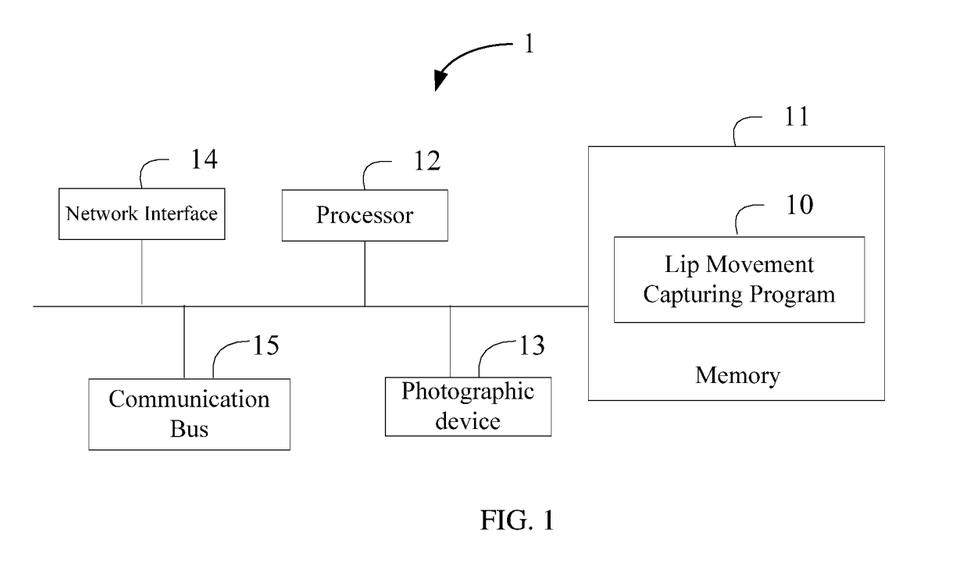
FIG. 1 is a schematic diagram of a running environment of a preferred embodiment of a lip movement capturing method according to the application.

The application provides a lip movement capturing method. FIG. 1 is a schematic diagram of a running environment of a preferred embodiment of a lip movement capturing method according to the application.

In the embodiment, the lip movement capturing method is applied to an electronic device 1. The electronic device 1 may be terminal equipment with an operation function such as a server, a smart phone, a tablet computer, a portable computer and a desktop computer.

The electronic device 1 includes a processor 12, a memory 11, a photographic device 13, a network interface 14 and a communication bus 15. Herein, the photographic device 13 is mounted at a specific place, for example, an office place and a monitoring region, shoots a target entering the specific place in real time to obtain a real-time image and transmits the shot real-time image to the processor 12 through a network. The network interface 14 may optionally include a standard wired interface and wireless interface (for example, wireless-fidelity (WI-FI) interface). The communication bus 15 is configured to implement connection and communication between these components.

The memory 11 includes at least one type of readable storage medium. The at least one type of readable storage medium may be a nonvolatile storage medium such as a flash memory, a hard disk, a multimedia card and a card type memory. In some embodiments, the readable storage medium may be an internal storage unit of the electronic device 1, for example, a hard disk of the electronic device 1. In some other embodiments, the readable storage medium may also be an external memory of the electronic device 1, for example, a plug-in type hard disk, smart media card (SMC), secure digital (SD) card and flash card configured on the electronic device 1.

In the embodiment, the readable storage medium of the memory 11 is usually configured to store a lip movement capturing program 10 installed in the electronic device 1, a facial image sample library, a constructed and trained lip average model and the like. The memory 11 may further be configured to temporally store data which has been output or is to be output.

In some embodiments, the processor 12 may be a central processing unit (CPU), a microprocessor or another data processing chip and is configured to run a program code stored in the memory 11 or process data, for example, executing the lip movement capturing program 10.

FIG. 1 only illustrates the electronic device 1 with the components 11-15 and the lip movement capturing program 10. However, it is to be understood that not all of the illustrated components are required to be implemented and, instead, more or fewer components may be implemented.

Optionally, the electronic device 1 may further include a user interface. The user interface may include an input unit such as a keyboard, a voice input device such as equipment with a voice recognition function like a microphone and a voice output device such as a sound and an earphone. Optionally, the user interface may also include a standard wired interface and wireless interface.

Optionally, the electronic device 1 may further include a display. The display may also be properly called a display screen or a display unit, and in some embodiments, may be a light-emitting diode (LED) display, a liquid crystal display, a touch liquid crystal display, an organic light-emitting diode (OLED) touch device and the like. The display is configured to display information processed in the electronic device 1 and configured to display a visual user interface.

Optionally, the electronic device 1 further includes a touch sensor. A region provided by the touch sensor for a touch operation of a user is called a touch region. In addition, the touch sensor may be a resistive touch sensor, a capacitive touch sensor and the like. Moreover, the touch sensor not only includes a contact type touch sensor and but also may include a proximity touch sensor and the like. Besides, the touch sensor may be a single sensor and may also be multiple sensors arranged in, for example, an array.

Furthermore, an area of the display of the electronic device 1 and an area of the touch sensor may be the same and may also be different. Optionally, the display and the touch sensor are arranged in a stacking manner to form a touch display screen. The device senses the touch operation triggered by the user on the basis of the touch display screen.

Optionally, the electronic device 1 may further include a Radio Frequency (RF) circuit, a sensor, an audio circuit and the like. No more elaborations will be made herein.

In the device embodiment shown in FIG. 1, the memory 11 used as a computer storage medium includes the lip movement capturing program 10. The processor 12 executes the lip movement capturing program 10 stored in the memory 11 to implement the following steps.

A real-time facial image acquisition step: a real-time image shot by the photographic device is acquired and a real-time facial image is extracted from the real-time image by use of a face recognition algorithm.

When the photographic device 13 shoots the real-time image, the photographic device 13 sends the real-time image to the processor 12. After the processor 12 receives the real-time image, a picture size is acquired at first and a grayscale image with the same size is constructed. The acquired color image is converted into the grayscale image and, meanwhile, a memory space is created. A histogram of the grayscale image is equalized to reduce an information amount of the grayscale image and increase a detection speed. Then, a training library is loaded, a face in the image is detected, an object including facial information is returned, data about a position of the face is obtained and an amount of the data is recorded. A portrait region is finally acquired and stored. In such a manner, a real-time facial image extraction process is completed.

Specifically, the face recognition algorithm for extracting the real-time facial image from the real-time image may be a geometric-feature-based method, a local feature analysis method, an eigenface method, an elastic-model-based method, a neural network method and the like.

A feature point recognition step: the real-time facial image is input into a pretrained lip average model and t lip feature points representative of positions of lips in the real-time facial image are recognized by use of the lip average model.

A sample library with n facial images is established and t feature points are artificially marked at a lip part in each facial image in the sample library, the t feature points being uniformly distributed at the upper and lower lips and left and right mouth corners.

A facial feature recognition model is trained by use of the facial images marked with the lip feature points to obtain the lip average model about faces. The facial feature recognition model is an ensemble of regression trees (ERT) algorithm. The ERT algorithm is represented by a formula as follows:

$$\hat{S}^{t+1} = \hat{S}^t + \tau_t(I, \hat{S}^t),$$

where t represents a concatenation sequence number and $\tau_t(\cdot,\cdot)$ represents a regressor of a present stage. Each regressor consists of multiple regression trees and an objective of training is to obtain these regression trees.

S (t) is a shape estimate of the present model. Each regressor $\tau_t(\cdot,\cdot)$ predicts an increment $\tau_t(I, \hat{S}^t)$ according to an input image I and S (t) and adds the increment to the present shape estimate to improve the present model. The regressors of each stage perform prediction according to the feature points. A training dataset is (I1, S1), ..., (In, Sn), where I is the input sample image and S is a shape feature vector consisting of feature points in the sample image.

In a model training process, the number of the facial images in the sample library is n. There is made such a hypothesis t=20, namely each sample picture has 20 feature points. Part of feature points of all the sample pictures (for example, 15 feature points are randomly selected from the 20 feature points of each sample picture) are extracted to train a first regression tree, a second tree is trained by use of residuals between predicted values of the first regression tree and true values (weighted averages of the 15 feature points extracted from each sample picture) of the part of feature points, and so on, when predicted values of an Nth trained tree and the true values of the part of feature points are close to zero, all regression trees of the ERT algorithm are obtained, the lip average model is obtained according to these regression trees and a model file and the sample library are stored in the memory 11. Since each sample image for training the model is marked with the 20 lip feature points, the trained lip average model for the faces may be configured to recognize 20 lip feature points from the facial image.

After the trained lip average model is called from the memory 11, the real-time facial image is aligned with the lip average model and then the real-time facial image is searched for the 20 lip feature points matched with 20 lip feature points of the lip average model by use of a feature extraction algorithm. There is made such a hypothesis that the 20 lip feature points recognized from the real-time facial image are still marked as P1~P20 and coordinates of the 20 lip feature points are $(x_1, y_1), (x_2, y_2), (x_3, y_3), \ldots, (x_{20}, y_{20})$ respectively.

Figure 2:
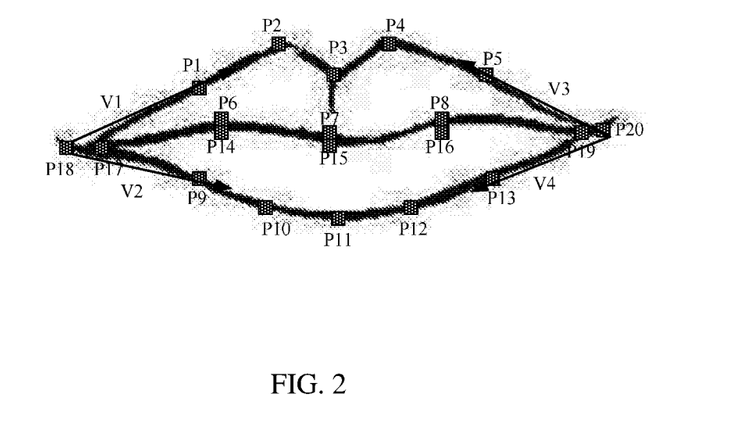
FIG. 2 is a schematic diagram of lip feature points in a preferred embodiment of a lip movement capturing method according to the application.

Herein, as shown in FIG. 2, there are eight feature points (marked as P1~P8 and P9~P16) respectively) on the upper and lower lips of the lip part respectively and two feature points (marked as P17~P18 and P19~P20 respectively) at left and right mouth corners respectively. In the eight feature points of the upper lip, five (P1~P5) are positioned on an outer contour line of the upper lip and three (P6~P8, P7 is an inner-side central feature point of the upper lip) are positioned on an inner contour line of the upper lip. In the eight feature points of the lower lip, five (P9~P13) are positioned on an outer contour line of the lower lip and three (P14~P16, P15 is an inner-side central feature point of the lower lip) are positioned on an inner contour line of the lower lip. In the two feature points of each of the left and right mouth corners, one (for example, P18 and P20, called outer mouth corner feature points) is positioned on the outer contour line of the corresponding lip and one (for example, P17 and P19, called inner mouth corner feature points) is positioned on the outer contour line of the corresponding lip. In the embodiment, the feature extraction algorithm is a scale-invariant feature transform (SIFT) algorithm. According to the SIFT algorithm, local features of each lip feature point are extracted from the lip average model for the faces, a lip feature point is selected as a reference feature point, and the real-time facial image is searched for a feature point with a local feature the same as or similar to that of the reference feature point (for example, a difference value of the local features of the two feature points is within a preset range). According to this principle, all of the lip feature points are found from the real-time facial image. In another embodiment, the feature extraction algorithm may also be a speeded up robust features (SURF) algorithm, a local binary patterns (LBP) algorithm, a histogram of oriented gradients (HOG) algorithm and the like.

A lip movement judgment step: a movement direction and movement distance of the lips in the real-time facial image are calculated according to x and y coordinates of the t lip feature points in the real-time facial image.

In the embodiment, the lip movement judgment step includes the following steps:

a distance between an inner-side central feature point of the upper lip and inner-side central feature point of the lower lip in the real-time facial image is calculated and an opening degree of the lips is judged;

a left-side outer mouth corner feature point is connected with feature points, closest to the left-side outer mouth corner feature point, on outer contour lines of the upper and lower lips to form vectors $\vec{V}_1$ and $\vec{V}_2$ respectively, and an included angle between the vectors $\vec{V}_1$ and $\vec{V}_2$ is calculated to obtain a leftward curling degree of the lips; and a right-side outer mouth corner feature point is connected with feature points, closest to the right-side outer mouth corner feature point, on the outer contour lines of the upper and lower lips to form vectors $\vec{V}_3$ and $\vec{V}_4$ respectively, and an included angle between the vectors $\vec{V}_3$ and $\vec{V}_4$ is calculated to obtain a rightward curling degree of the lips.

In the real-time facial image, coordinates of the inner-side central feature point P7 of the upper lip are $(x_7, y_7)$ and coordinates of the inner-side central feature point P15 of the lower lip are $(x_{15}, y_{15})$. Then, a formula for the distance between the two points is as follows:

$$d=\sqrt{(x_7-x_{15})^2+(y_7-y_{15})^2}.$$

If d=0, it is indicated that the two points P7 and P15 are overlapped, that is, the lips are in a closed state. If d>0, the opening degree of the lips is judged according to a magnitude of d, and if d is larger, it is indicated that the opening degree of the lips is higher.

Coordinates of the left-side outer mouth corner feature point P18 are $(x_{18}, y_{18})$, coordinates of the feature points P1 and P9, closest to P18, on the outer contour lines of the upper and lower lips are $(x_1, y_1)$ and $(x_9, y_9)$ respectively, P18 is connected with P1 and P9 to form the vectors $\vec{V}_1$ and $\vec{V}_2$ respectively and the included angle α between the vectors $\vec{V}_1$ and $\vec{V}_2$ is calculated through the following calculation formula:

$$\cos α = \vec{V}_1 \cdot \vec{V}_2 / |\vec{V}_1||\vec{V}_2|,$$

where $\vec{V}_1=(x_1-x_{18}, y_1-y_{18})$, $\vec{V}_2=(x_9-x_{18}, y_9-y_{18})$ and α represents the included angle between the vectors $\vec{V}_1$ and $\vec{V}_2$. The included angle may be calculated to judge the leftward curling degree of the lips. If the included angle is smaller, it is indicated that the leftward curling degree of the lips is higher.

Similarly, coordinates of the right-side outer mouth corner feature point P20 are $(x_{20}, y_{20})$, coordinates of the feature points P5 and P13, closest to P20, on the outer contour lines of the upper and lower lips are $(x_5, y_5)$ and $(x_{13}, y_{13})$ respectively, P20 is connected with P5 and P13 to form the vectors $\vec{V}_3$ and $\vec{V}_4$ respectively and the included angle between the vectors $\vec{V}_3$ and $\vec{V}_4$ is calculated through the following calculation formula:

$$\cos β = \vec{V}_3 \cdot \vec{V}_4 / |\vec{V}_3||\vec{V}_4|,$$

where $\vec{V}_3=(x_5-x_{20}, y_5-y_{20})$, $\vec{V}_4=(x_{13}-x_{20}, y_{13}-y_{20})$ and β represents the included angle between the vectors $\vec{V}_3$ and $\vec{V}_4$. The included angle may be calculated to judge the rightward curling degree of the lips. If the included angle is smaller, it is indicated that the rightward curling degree of the lips is higher.

According to the electronic device 1 disclosed in the embodiment, the real-time facial image is extracted from the real-time image, the lip feature points in the real-time facial image are recognized by use of the lip average model and movement information of the lips in the real-time facial image is calculated according to the coordinates of the lip feature points to implement real-time capturing of movements of the lips.

Figure 3:
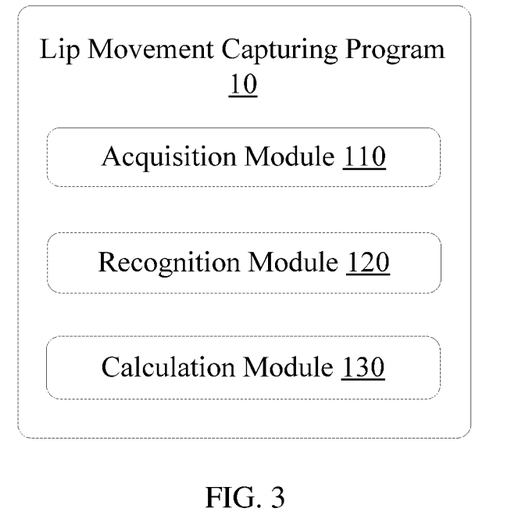
FIG. 3 is a schematic diagram of modules of a lip movement capturing program in FIG. 1.

In another embodiment, the lip movement capturing program 10 may further be divided into one or more modules and the one or more modules are stored in the memory 11 and executed by the processor 12 to implement the application. The modules in the application refer to a series of computer program instruction segments capable of realizing specific functions. FIG. 3 is a schematic diagram of modules of a lip movement capturing program in FIG. 1. In the embodiment, the lip movement capturing program 10 may be divided into an acquisition module 110, a recognition module 120 and a calculation module 130. Functions or operation steps implemented by the modules 110-130 are similar to the above and will not be elaborated herein. Exemplarily, the acquisition module 110 is configured to acquire a real-time image shot by a photographic device 13 and extract a real-time facial image from the real-time image by use of a face recognition algorithm.

The recognition module 120 is configured to input the real-time facial image into a pretrained lip average model and recognize t lip feature points representative of positions of lips in the real-time facial image by use of the lip average model.

The calculation module 130 is configured to calculate a movement direction and movement distance of the lips in the real-time facial image according to x and y coordinates of the t lip feature points in the real-time facial image.

Figure 4:
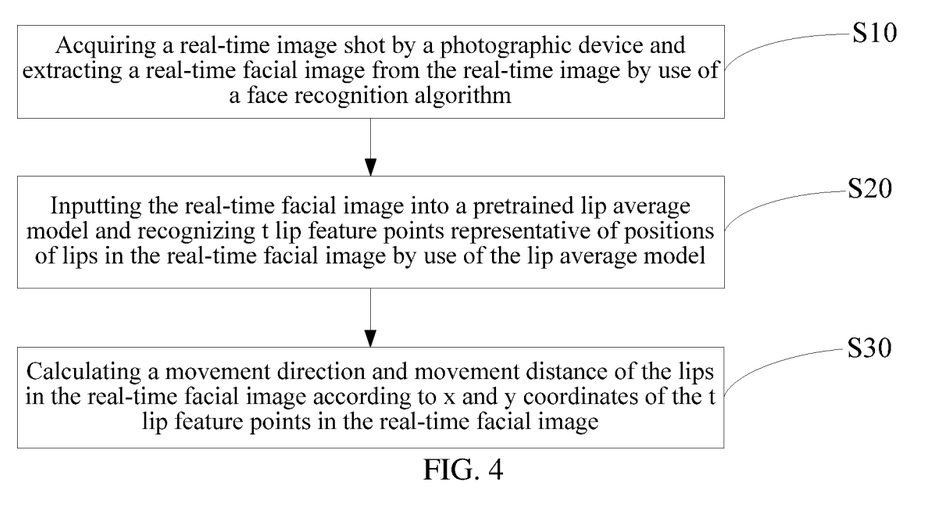
FIG. 4 is a flowchart of a preferred embodiment of a lip movement capturing method according to the application.

In addition, the application also provides a lip movement capturing method. FIG. 4 is a flowchart of a preferred embodiment of a lip movement capturing method according to the application. The method may be executed by a device and the device may be implemented by software and/or hardware.

In the embodiment, the lip movement capturing method includes the following steps:

In S10, a real-time image shot by a photographic device is acquired and a real-time facial image is extracted from the real-time image by use of a face recognition algorithm. When the photographic device shoots the real-time image, the photographic device sends the real-time image to a processor. After the processor receives the real-time image, a picture size is acquired at first and a grayscale image with the same size is constructed. The acquired color image is converted into the grayscale image and, meanwhile, a memory space is created. A histogram of the grayscale image is equalized to reduce an information amount of the grayscale image and increase a detection speed. Then, a training library is loaded, a face in the image is detected, an object including facial information is returned, data about a position of the face is obtained and an amount of the data is recorded. A portrait region is finally acquired and stored. In such a manner, a real-time facial image extraction process is completed.

Specifically, the face recognition algorithm for extracting the real-time facial image from the real-time image may also be a geometric-feature-based method, a local feature analysis method, an eigenface method, an elastic-model-based method, a neural network method and the like.

In S20, the real-time facial image is input into a pretrained lip average model and t lip feature points representative of positions of lips in the real-time facial image are recognized by use of the lip average model.

A sample library with n facial images is established and t feature points are artificially marked at a lip part in each facial image in the sample library, the t feature points being uniformly distributed at the upper and lower lips and left and right mouth corners.

A facial feature recognition model is trained by use of the facial images marked with the lip feature points to obtain the lip average model about faces. The facial feature recognition model is an ERT algorithm. The ERT algorithm is represented by a formula as follows:

$$\hat{S}^{t+1} = \hat{S}^t + \tau_t(I, \hat{S}^t),$$

where t represents a concatenation sequence number $\tau_t(\bullet,\bullet)$ and represents a regressor of a present stage. Each regressor consists of multiple regression trees and an objective of training is to obtain these regression trees.

S (t) is a shape estimate of the present model. Each regressor $\tau_t(\bullet,\bullet)$ predicts an increment $\tau_t(I, \hat{S}^t)$ according to an input image I and S (t) and adds the increment to the present shape estimate to improve the present model. The regressors of each stage perform prediction according to the feature points. A training dataset is (I1, S1), . . . , (In, Sn), where I is the input sample image and S is a shape feature vector consisting of feature points in the sample image.

In a model training process, the number of the facial images in the sample library is n. There is made such a hypothesis t=20, namely each sample picture has 20 feature points. Part of feature points of all the sample pictures (for example, 15 feature points are randomly selected from the 20 feature points of each sample picture) are extracted to train a first regression tree, a second tree is trained by use of residuals between predicted values of the first regression tree and true values (weighted averages of the 15 feature points extracted from each sample picture) of the part of feature points, and so on, when predicted values of an Nth trained tree and the true values of the part of feature points are close to zero, all regression trees of the ERT algorithm are obtained, the lip average model is obtained according to these regression trees and a model file and the sample library are stored in a memory. Since each sample image for training the model is marked with the 20 lip feature points, the trained lip average model for the faces may be configured to recognize 20 lip feature points from the facial image.

After the trained lip average model is called from the memory, the real-time facial image is aligned with the lip average model and then the real-time facial image is searched for the 20 lip feature points matched with 20 lip feature points of the lip average model by use of a feature extraction algorithm. There is made such a hypothesis that the 20 lip feature points recognized from the real-time facial image are still marked as P1~P20 and coordinates of the 20 lip feature points are $(x_1, y_1), (x_2, y_2), (x_3, y_3), \ldots, (x_{20}, y_{20})$ respectively.

Herein, as shown in FIG. 2, there are eight feature points (marked as P1~P8 and P9~P16) respectively) on the upper and lower lips of the lip part respectively and two feature points (marked as P17~P18 and P19~P20 respectively) at left and right mouth corners respectively. In the eight feature points of the upper lip, five (P1~P5) are positioned on an outer contour line of the upper lip and three (P6~P8, P7 is an inner-side central feature point of the upper lip) are positioned on an inner contour line of the upper lip. In the eight feature points of the lower lip, five (P9~P13) are positioned on an outer contour line of the lower lip and three (P14~P16, P15 is an inner-side central feature point of the lower lip) are positioned on an inner contour line of the lower lip. In the two feature points of each of the left and right mouth corners, one (for example, P18 and P20, called outer mouth corner feature points) is positioned on the outer contour line of the corresponding lip and one (for example, P17 and P19, called inner mouth corner feature points) is positioned on the outer contour line of the corresponding lip.

Specifically, the feature extraction algorithm may also be a SIFT algorithm, a SURF algorithm, an LBP algorithm, a HOG algorithm and the like.

In S30, a movement direction and movement distance of the lips in the real-time facial image are calculated according to x and y coordinates of the t lip feature points in the real-time facial image.

In the embodiment, S30 includes the following steps:

a distance between an inner-side central feature point of the upper lip and inner-side central feature point of the lower lip in the real-time facial image is calculated and an opening degree of the lips is judged;

a left-side outer mouth corner feature point is connected with feature points, closest to the left-side outer mouth corner feature point, on outer contour lines of the upper and lower lips to form vectors $\vec{V}_1$ and $\vec{V}_2$ respectively, and an included angle between the vectors $\vec{V}_1$ and $\vec{V}_2$ is calculated to obtain a leftward curling degree of the lips; and a right-side outer mouth corner feature point is connected with feature points, closest to the right-side outer mouth corner feature point, on the outer contour lines of the upper and lower lips to form vectors $\vec{V}_3$ and $\vec{V}'_4$ respectively, and an included angle between the vectors $\vec{V}_3$ and $\vec{V}_4$ is calculated to obtain a rightward curling degree of the lips.

In the real-time facial image, coordinates of the inner-side central feature point P7 of the upper lip are $(x_7, y_7)$ and coordinates of the inner-side central feature point P15 of the lower lip are $(x_{15}, y_{15})$. Then, a formula for the distance between the two points is as follows:

$$d = \sqrt{(x_7 - x_{15})^2 + (y_7 - y_{15})^2}.$$

If d=0, it is indicated that the two points P7 and P15 are overlapped, that is, the lips are in a closed state. If d>0, the opening degree of the lips is judged according to a magnitude of d, and if d is larger, it is indicated that the opening degree of the lips is higher.

Coordinates of the left-side outer mouth corner feature point P18 are $(x_{18}, y_{18})$, coordinates of the feature points P1 and P9, closest to P18, on the outer contour lines of the upper and lower lips are $(x_1, y_1)$ and $(x_9, y_9)$ respectively, P18 is connected with P1 and P9 to form the vectors $\vec{V}_1$ and $\vec{V}_2$ respectively and the included angle $\alpha$ between the vectors $\vec{V}'_1$ and $\vec{V}_2$ is calculated through the following calculation formula:

$$\cos \alpha = \vec{V}_1 \cdot \vec{V}_2 / |\vec{V}_1||\vec{V}_2|,$$

where $\vec{V}_1 = (x_1 - x_{18}, y_1 - y_{18})$, $\vec{V}_2 = (x_9 - x_{18}, y_9 - y_{18})$ and $\alpha$ represents the included angle between the vectors $\vec{V}_1$ and $\vec{V}_2$. The included angle may be calculated to judge the leftward curling degree of the lips. If the included angle is smaller, it is indicated that the leftward curling degree of the lips is higher.

Similarly, coordinates of the right-side outer mouth corner feature point P20 are $(x_{20}, y_{20})$, coordinates of the feature points P5 and P13, closest to P20, on the outer contour lines of the upper and lower lips are $(x_5, y_5)$ and $(x_{13}, y_{13})$ respectively, P20 is connected with P5 and P13 to form the vectors $\vec{V}_3$ and $\vec{V}_4$ respectively and the included angle between the vectors $\vec{V}_3$ and $\vec{V}_4$ is calculated through the following calculation formula:

$$\cos \beta = \vec{V}_3 \cdot \vec{V}_4 / |\vec{V}_3||\vec{V}_4|.$$

Where $\vec{V}_3=(x_5-x_{20}, y_5-y_{20})$, $\vec{V}_2=(x_{13}-x_{20}, y_{13}-y_{20})$ and $\beta$ represents the included angle between the vectors $\vec{V}_3$ and $\vec{V}_4$. The included angle may be calculated to judge the rightward curling degree of the lips. If the included angle is smaller, it is indicated that the rightward curling degree of the lips is higher.

According to the lip movement capturing method disclosed in the embodiment, the lip feature points in the real-time facial image are recognized by use of the lip average model and movement information of the lips in the real-time facial image is calculated according to the coordinates of the lip feature points to implement real-time capturing of movements of the lips.

Moreover, an embodiment of the application also discloses a computer-readable storage medium, which includes a lip movement capturing program, the lip movement capturing program being executed by a processor to implement the following operations:

a real-time facial image acquisition step: a real-time image shot by a photographic device is acquired and a real-time facial image is extracted from the real-time image by use of a face recognition algorithm;

a feature point recognition step: the real-time facial image is input into a pretrained lip average model and t lip feature points representative of positions of lips in the real-time facial image are recognized by use of the lip average model; and a lip movement judgment step: a movement direction and movement distance of the lips in the real-time facial image are calculated according to x and y coordinates of the t lip feature points in the real-time facial image.

Optionally, the lip movement judgment step includes:

a distance between an inner-side central feature point of the upper lip and inner-side central feature point of the lower lip in the real-time facial image is calculated and an opening degree of the lips is judged;

a left-side outer mouth corner feature point is connected with feature points, closest to the left-side outer mouth corner feature point, on outer contour lines of the upper and lower lips to form vectors $\vec{V}_1$ and $\vec{V}_2$ respectively, and an included angle between the vectors $\vec{V}_1$ and $\vec{V}_2$ is calculated to obtain a leftward curling degree of the lips; and a right-side outer mouth corner feature point is connected with feature points, closest to the right-side outer mouth corner feature point, on the outer contour lines of the upper and lower lips to form vectors $\vec{V'}_3$ and $\vec{V}_4$ respectively, and an included angle between the vectors $\vec{V}_3$ and $\vec{V}_4$ is calculated to obtain a rightward curling degree of the lips.

Optionally, the feature point recognition step further includes:

the real-time facial image is aligned with the lip average model and the real-time facial image is searched for the t lip feature points matched with t lip feature points of the lip average model by use of a feature extraction algorithm.

Optionally, training steps for the lip average model include that:

a sample library with n facial images is established and t feature points are marked at a lip part in each facial image in the sample library, the t feature points being uniformly distributed at the upper and lower lips and left and right mouth corners; and a facial feature recognition model is trained by use of the facial images marked with the lip feature points to obtain the lip average model about faces.

Specific implementation modes of the computer-readable storage medium of the application are substantially the same as the specific implementation modes of the lip movement capturing method and will not be elaborated herein.

It is to be noted that terms "include" and "contain" or any other variant thereof in the disclosure are intended to cover nonexclusive inclusions, so that a process, device, object or method including a series of elements not only includes those elements but also includes other elements which are not listed clearly or further includes elements intrinsic to the process, the device, the object or the method. Under the condition of no more restrictions, an element defined by a statement "including a/an . . . " does not exclude existence of the same other element in a process, device, object or method including the element.

The foregoing numbering of the embodiments of the application is intended for description only, and is not indicative of the pros and cons of these embodiments. By the description of the foregoing embodiments, it will be evident to those skilled in the art that the methods of the embodiments can be implemented by means of software plus the necessary general-purpose hardware platform; and they can of course be implemented by hardware, but in many cases the former will be more advantageous. Based on such an understanding, the essential technical solution of the application, or the portion that contributes to the prior art may be embodied as software products. Computer software products can be stored in a storage medium (e.g., a read-only memory (ROM)/random access memory (RAM), a magnetic disk, an optical disc), including multiple instructions that, when executed, can cause a computing device (e.g., a mobile phone, a computer, a server, a network device), to execute the methods described in the various embodiments of the application.

The above is only the preferred embodiment of the application and therefore is not intended as limiting the patentable scope of the application. Any equivalent configurational or flow transformations that are made taking advantage of the application and that are used directly or indirectly in any other related technical field shall all fall in the scope of protection of the application.

What is claimed is:

1. An electronic device, comprising: a memory, a processor and a photographic device, the memory comprising a lip movement capturing program and the lip movement capturing program being executed by the processor to implement the following steps of:

a real-time facial image acquisition step: acquiring a real-time image shot by a photographic device and extracting a real-time facial image from the real-time image by use of a face recognition algorithm;

a feature point recognition step: inputting the real-time facial image into a pretrained lip average model and recognizing t lip feature points representative of positions of lips in the real-time facial image by use of the lip average model; and a lip movement judgment step: calculating a movement direction and movement distance of the lips in the real-time facial image according to x and y coordinates of the t lip feature points in the real-time facial image;

wherein the lip movement judgment step comprising:

calculating a distance between an inner-side central feature point of the upper lip and inner-side central feature point of the lower lip in the real-time facial image and judging an opening degree of the lips;

connecting a left-side outer mouth corner feature point with feature points, closest to the left-side outer mouth corner feature point, on outer contour lines of the upper and lower lips to form vectors $\vec{V}_1$ and $\vec{V}_2$ respectively, and calculating an included angle between the vectors $\vec{V}_1$ and $\vec{V}_2$ to obtain a leftward curling degree of the lips; and connecting a right-side outer mouth corner feature point with feature points, closest to the right-side outer mouth corner feature point, on the outer contour lines of the upper and lower lips to form vectors $\vec{V}_3$ and $\vec{V}_4$ respectively, and calculating an included angle between the vectors $\vec{V}_3$ and $\vec{V}_4$ to obtain a rightward curling degree of the lips.

2. The electronic device of claim 1, wherein the feature point recognition step further comprises:

aligning the real-time facial image and the lip average model and searching the real-time facial image for the t lip feature points matched with t lip feature points of the lip average model by use of a feature extraction algorithm.

3. The electronic device of claim 1, wherein the training steps for the lip average model comprise:

establishing a sample library with n facial images and marking t feature points at a lip part in each facial image in the sample library, the t feature points being uniformly distributed at the upper and lower lips and left and right mouth corners; and training a facial feature recognition model by use of the facial images marked with the lip feature points to obtain the lip average model about faces.

4. A lip movement capturing method, applied to an electronic device and comprising:

a real-time facial image acquisition step: acquiring a real-time image shot by a photographic device and extracting a real-time facial image from the real-time image by use of a face detection algorithm;

a feature point recognition step: inputting the real-time facial image into a pretrained lip average model and recognizing t lip feature points representative of positions of lips in the real-time facial image by use of the lip average model; and a lip movement judgment step: calculating a movement direction and movement distance of the lips in the real-time facial image according to x and y coordinates of the t lip feature points in the real-time facial image;

wherein the lip movement judgment step comprises:

calculating a distance between an inner-side central feature point of the upper lip and inner-side central feature point of the lower lip in the real-time facial image and judging an opening degree of the lips;

connecting a left-side outer mouth corner feature point with feature points, closest to the left-side outer mouth corner feature point, on outer contour lines of the upper and lower lips to form vectors $\vec{V}_1$ and $\vec{V}_2$ respectively, and calculating an included angle between the vectors $\vec{V}_1$ and $\vec{V}_2$ to obtain a leftward curling degree of the lips; and connecting a right-side outer mouth corner feature point with feature points, closest to the right-side outer mouth corner feature point, on the outer contour lines of the upper and lower lips to form vectors $\vec{V}_3$ and $\vec{V}_4$ respectively, and calculating an included angle between the vectors $\vec{V}_3$ and $\vec{V}_4$ to obtain a rightward curling degree of the lips.

5. The lip movement capturing method of claim 4, wherein the feature point recognition step further comprises:

aligning the real-time facial image and the lip average model and searching the real-time facial image for the t lip feature points matched with t lip feature points of the lip average model by use of a feature extraction algorithm.

6. The lip movement capturing method of claim 4, wherein training steps for the lip average model comprise:

establishing a sample library with n facial images and marking t feature points at a lip part in each facial image in the sample library, the t feature points being uniformly distributed at the upper and lower lips and left and right mouth corners; and training a facial feature recognition model by use of the facial images marked with the lip feature points to obtain the lip average model about faces.

7. The lip movement capturing method of claim 4, wherein the face recognition algorithm comprises a geometric-feature-based method, a local feature analysis method, an eigenface method, an elastic-model-based method and a neural network method.

8. A non-transitory computer-readable storage medium, comprising a lip movement capturing program, the lip movement capturing program being executed by a processor to implement the following steps of:

a real-time facial image acquisition step: acquiring a real-time image shot by a photographic device and extracting a real-time facial image from the real-time image by use of a face recognition algorithm;

a feature point recognition step: inputting the real-time facial image into a pretrained lip average model and recognizing t lip feature points representative of positions of lips in the real-time facial image by use of the lip average model; and a lip movement judgment step: calculating a movement direction and movement distance of the lips in the real-time facial image according to x and y coordinates of the t lip feature points in the real-time facial image;

wherein the lip movement judgment step comprises:

calculating a distance between an inner-side central feature point of the upper lip and inner-side central feature point of the lower lip in the real-time facial image and judging an opening degree of the lips;

connecting a left-side outer mouth corner feature point with feature points, closest to the left-side outer mouth corner feature point, on outer contour lines of the upper and lower lips to form vectors $\vec{V}_1$ and $\vec{V}_2$ respectively, and calculating an included angle between the vectors $\vec{V}_1$ and $\vec{V}_2$ to obtain a leftward curling degree of the lips; and connecting a right-side outer mouth corner feature point with feature points, closest to the right-side outer mouth corner feature point, on the outer contour lines of the upper and lower lips to form vectors $\vec{V}_3$ and $\vec{V}_4$ respectively, and calculating an included angle between the vectors $\vec{V}_3$ and $\vec{V}_4$ to obtain a rightward curling degree of the lips.

9. The non-transitory computer-readable storage medium of claim 8, wherein the feature point recognition step further comprises:
aligning the real-time facial image and the lip average model and searching the real-time facial image for the t lip feature points matched with t lip feature points of the lip average model by use of a feature extraction algorithm.

10. The non-transitory computer-readable storage medium of claim 8, wherein training steps for the lip average model comprise:
establishing a sample library with n facial images and marking t feature points at a lip part in each facial image in the sample library, the t feature points being uniformly distributed at the upper and lower lips and left and right mouth corners; and
training a facial feature recognition model by use of the facial images marked with the lip feature points to obtain the lip average model about faces.

* * * * *